(12) United States Patent
Laufer et al.

(10) Patent No.: US 9,530,537 B2
(45) Date of Patent: Dec. 27, 2016

(54) HALOGEN-FREE PROPYLENE-BASED INSULATION AND CONDUCTOR COATED WITH SAME

(75) Inventors: Caroline H. Laufer, Millington, NJ (US); Lin Fu, Naperville, IL (US); Thomas S. Lin, Whippany, NJ (US); Matthew T. Bishop, Midland, MI (US); Hamed Lakrout, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 145 days.

(21) Appl. No.: 14/346,790

(22) PCT Filed: Sep. 14, 2012

(86) PCT No.: PCT/US2012/055483
§ 371 (c)(1),
(2), (4) Date: Mar. 24, 2014

(87) PCT Pub. No.: WO2013/048784
PCT Pub. Date: Apr. 4, 2013

(65) Prior Publication Data
US 2014/0231119 A1    Aug. 21, 2014

Related U.S. Application Data

(60) Provisional application No. 61/541,616, filed on Sep. 30, 2011.

(51) Int. Cl.
| | |
|---|---|
| H01B 3/30 | (2006.01) |
| H01B 3/44 | (2006.01) |
| C08L 23/12 | (2006.01) |
| H01B 7/295 | (2006.01) |
| C08K 3/28 | (2006.01) |
| C08K 3/32 | (2006.01) |
| C08K 5/52 | (2006.01) |
| C08K 5/5399 | (2006.01) |

(52) U.S. Cl.
CPC .............. *H01B 3/441* (2013.01); *C08L 23/12* (2013.01); *H01B 7/295* (2013.01); *C08K 3/28* (2013.01); *C08K 3/32* (2013.01); *C08K 5/5205* (2013.01); *C08K 5/5399* (2013.01); *C08L 2201/02* (2013.01)

(58) Field of Classification Search
CPC ............ C08G 18/69; C08K 3/32; C08K 3/28; C08K 3/346; C08K 5/5205; C08K 5/5399; C08K 5/34924; C08K 5/34922; C08K 5/5313; C08K 5/0066; C08K 5/16; C08L 2201/02; C08L 23/12; C08L 23/10; C08L 23/0815; C08L 23/02; C08L 75/04; C08L 77/00; C08L 77/02; C09D 123/02; H01B 3/441; H01B 3/427; H01B 7/295; H01B 7/0208; Y10T 428/31551; Y10T 428/24802

USPC .. 174/110 V, 110 R; 428/17, 195.1; 524/528, 524/100, 101, 186, 197, 106, 126, 135, 524/86, 133; 525/123
See application file for complete search history.

(56) References Cited

U.S. PATENT DOCUMENTS

| | | | |
|---|---|---|---|
| 6,894,227 B2 | 5/2005 | Kanamori et al. | |
| 6,943,218 B1 | 9/2005 | Sanduja et al. | |
| 8,901,426 B2 * | 12/2014 | Grizante Redondo | C08L 23/04 174/113 R |
| 2006/0131051 A1 * | 6/2006 | Mhetar | H01B 3/427 174/110 R |
| 2006/0191706 A1 | 8/2006 | Mhetar et al. | |
| 2008/0167422 A1 | 7/2008 | Hashimoto | |
| 2008/0277136 A1 | 11/2008 | Reyes | |
| 2009/0124743 A1 | 5/2009 | Lee | |
| 2009/0266576 A1 | 10/2009 | Mhetar et al. | |
| 2010/0016482 A1 * | 1/2010 | Heck | C08L 23/12 524/101 |
| 2010/0028568 A1 * | 2/2010 | Weaver | C08G 18/69 428/17 |
| 2011/0275743 A1 * | 11/2011 | Ishii | C08K 5/0066 524/106 |
| 2012/0261163 A1 | 10/2012 | Tai et al. | |

FOREIGN PATENT DOCUMENTS

| | | |
|---|---|---|
| CN | 1506398 A | 6/2004 |
| CN | 1807499 A | 7/2006 |
| EP | 0546841 A1 | 6/1993 |
| EP | 0871181 A1 | 10/1998 |
| EP | 1221463 A1 | 7/2002 |
| EP | 1221464 A1 | 7/2002 |

(Continued)

OTHER PUBLICATIONS

Technical Support Handbook DSM melapur-Jun. 25, 2001.*

(Continued)

*Primary Examiner* — Timothy Thompson
*Assistant Examiner* — Guillermo Egoavil
(74) *Attorney, Agent, or Firm* — Husch Blackwell LLP

(57) ABSTRACT

The present disclosure is directed to a halogen-free composition and conductors coated with the halogen-free composition. The halogen-free composition includes (A) from 70 wt % to 85 wt % of a polymeric component and (B) from 30 wt % to 15 wt % of a halogen-free flame retardant. The polymeric component (A) includes (i) a propylene homopolymer or a mini-random copolymer with greater than 40% crystallinity and (ii) an ethylene/α-olefin copolymer. The halogen-free composition has a density less than 1.15 g/cc. The halogen-free composition also has a scrape abrasion resistance of greater than or equal to 350 cycles as measured in accordance with ISO 6722.

19 Claims, No Drawings

(56) References Cited

FOREIGN PATENT DOCUMENTS

| EP | 1501103 A1 | 1/2005 |
|---|---|---|
| EP | 1990808 A2 | 11/2008 |
| GB | 2406857 A | 4/2005 |
| WO | 02/36680 A1 | 5/2002 |
| WO | 2004/019362 A1 | 3/2004 |
| WO | 20061065502 A1 | 6/2006 |
| WO | 2008/079998 A1 | 7/2008 |
| WO | 2011/079457 A1 | 7/2011 |

OTHER PUBLICATIONS

ISO 6722-2006 Sect 9.3, 2006, IHS.*
ISO 6722-2006 Sect 9.3.*
Technical Support Handbook DSM melapur-2001.*

* cited by examiner

HALOGEN-FREE PROPYLENE-BASED INSULATION AND CONDUCTOR COATED WITH SAME

CROSS REFERENCE TO RELATED APPLICATION

The present application is the national phase of PCT Patent Application No. PCT/US2012/055483 filed Sep. 14, 2012, which claims priority to U.S. Provisional Application No. 61/541,616, filed Sep. 30, 2011, the entire content of which is incorporated by reference herein.

BACKGROUND

Consumer demand for vehicles with complex power systems and more sophisticated entertainment systems continues to grow rapidly. To meet this demand, the wire and cable art is driven to downgauge wire/cable insulation to ever-smaller thickness. Wire/cable with downgauged insulation enables equipment manufacturers to install more wires in a vehicle harness assembly in order to meet this growing demand for more complex power and sophisticated "infotainment" systems in automobiles, for example.

Accordingly, the art recognizes the need for halogen-free insulation material that can meet wire performance requirements when downgauged. A need further exists for a coated conductor with a thin (greater than 0.2 mm to 2.0 mm), or an ultra-thin (0.2 mm and less), insulation layer that can meet automotive performance requirements such as sandpaper abrasion resistance, scrape abrasion resistance, and/or pinch resistance.

SUMMARY

The present disclosure is directed to a halogen-free composition and conductors coated with the halogen-free composition.

In an embodiment, a halogen-free composition is provided and includes (A) from 70 wt % to 85 wt % of a polymeric component and (B) from 30 wt % to 15 wt % of a halogen-free flame retardant. The polymeric component (A) includes (i) a propylene homopolymer or a mini-random copolymer with greater than 40% crystallinity and (ii) an ethylene/α-olefin copolymer. The halogen-free composition has a density less than 1.15 g/cc. The halogen-free composition also has a scrape abrasion resistance of greater than or equal to 350 cycles as measured in accordance with ISO 6722.

In an embodiment, a coated conductor is provided and includes a conductor and a coating on the conductor. The coating is formed from the halogen-free composition described above. In particular, the coating includes the halogen-free composition with (A) from 70 wt % to 85 wt % of a polymeric component and (B) from 30 wt % to 15 wt % of a halogen-free flame retardant. The polymeric component (A) includes (i) a propylene homopolymer with greater than 40% crystallinity and (ii) an ethylene/α-olefin copolymer. The coating has a density less than 1.15 g/cc. The coating has a scrape abrasion resistance of greater than or equal to 350 cycles as measured in accordance with ISO 6722.

In an embodiment, the coating of the coated conductor has a thickness from 0.1 mm to 2.0 mm.

An advantage of the present disclosure is a flame retardant, halogen-free insulation for wire/cable that avoids or otherwise omits metal hydroxide as a component.

An advantage of the present disclosure is a flame retardant, halogen-free, insulation material for ultra-thin wire/cable applications.

An advantage of the present disclosure is a coated conductor with a flame retardant, halogen-free coating for automotive thin and/or ultra-thin wire applications.

DETAILED DESCRIPTION

The present disclosure provides a composition. In an embodiment, a halogen-free composition is provided and includes (A) a polymeric component and (B) a halogen-free flame retardant ("HFFR"). The polymeric component includes (i) a propylene homopolymer or a mini-random copolymer with greater than 40% crystallinity, and (ii) an ethylene/α-olefin copolymer. The halogen-free composition has a scrape abrasion resistance greater than or equal to 350 cycles.

1. Propylene Homopolymer

The polymeric component includes a propylene homopolymer or a mini-random copolymer with greater than 40% crystallinity. The propylene homopolymer can comprise either isotactic or syndiotactic propylene homopolymer. In an embodiment, the propylene homopolymer is an isotactic propylene homopolymer, in order to maximize the crystallinity of the polymer.

A "mini-random copolymer," as used herein, is a propylene-based copolymer comprising 97 wt % to less than 100 wt % units derived from propylene and from 3 wt % to greater than 0 wt % units derived from an α-olefin comonomer. In an embodiment, the mini-random copolymer is a propylene/ethylene copolymer. The polymeric component may include a blend of the propylene homopolymer and the mini-random copolymer.

In an embodiment, the propylene homopolymer or the mini-random copolymer has at least 40%, or at least 55%, or 60% to 75%, or 70%, or 65% crystallinity. In a further embodiment, the propylene homopolymer has a xylene solubles content from 0.1 weight percent (wt %), or 0.2 wt %, or 0.5 wt % to 2.0 wt %, or 1.5 wt %, or 1.0 wt %.

In an embodiment, the propylene homopolymer or the mini-random copolymer has a melt flow rate from 1.0 grams per 10 minutes (g/10 min), or 2.0, g/10 min, or 3.0 g/10 min to less than or equal to 12 g/10 min, or 9 g/10 min, or 8 g 10 min, or 6 g/10 min, or 4 g/10 min. The propylene homopolymer has a molecular weight distribution (MWD) from 1.0, or 1.5, or 2.0 to 6.0, or 5.5, or 5.0.

In an embodiment, the propylene homopolymer or the mini-random copolymer has a crystallinity of at least 55% and a melt flow rate less than or equal to 4 g/10 min. In a further embodiment, the propylene homopolymer or mini-random copolymer has a crystallinity greater than or equal to 55% to 75% and a melt flow rate less than or equal to 4 g/10 min.

The propylene homopolymer or mini-random copolymer can be prepared using Ziegler-Natta catalyst systems, using metallocene catalyst systems, or using constrained geometry catalyst systems.

In an embodiment, the propylene homopolymer or the mini-random copolymer has a density from 0.87 grams per cubic centimeter (glee) to 0.93 g/cc. In a further embodiment, the propylene homopolymer has a density of 0.90 g/cc.

In an embodiment, a nucleating agent is blended with the propylene homopolymer or a mini-random copolymer to increase crystallinity. Nonlimiting examples of suitable nucleating agent include ADK NA-11 and ADK NA-21, which are available commercially from Asahi Denka Kokai. In a further embodiment, the nucleating agent is incorporated into the propylene homopolymer at levels of at least 500 parts per million (ppm), or at least 650 ppm, or at least 750 ppm.

2. Ethylene/α-Olefin

The polymeric component of the present halogen-free composition includes an ethylene/α-olefin copolymer. The term, "ethylene/α-olefin copolymer," as used herein, is a polymer that comprises a majority weight percent polymerized ethylene monomer (based on the total weight of polymerizable monomers), at least one polymerized olefin comonomer and optionally may comprise and additional polymerized comonomer.

The ethylene/α-olefin copolymer contains ethylene monomer and one or more α-olefin comonomers having 3 to 12 carbon atoms. The ethylene/α-olefin copolymer contains from 0.5 wt % to less than 20 wt % units derived from α-olefin comonomer(s). Weight percent is based on the total weight of the ethylene/α-olefin copolymer. The ethylene/α-olefin copolymer can be a linear ethylene/α-olefin polymer or a substantially linear ethylene/α-olefin polymer. A "substantially linear ethylene/α-olefin copolymer" is a homogeneously branched ethylene copolymer (interpolymer) which possesses a narrow short chain branching distribution and contains long chain branches as well as short chain branches attributable to homogeneous comonomer incorporation. The long chain branches are of the same structure as the backbone of the polymer and are longer than the short chain branches. Substantially linear ethylene/α-olefin polymer has from 0.01, or 0.5 to 3, or 1 long chain branch/1000 carbons. These polymers are elastomers, which are polymeric chains that are able to alter their arrangements and extensions in space in response to an imposed stress.

In an embodiment, the ethylene/α-olefin has a density less than 0.90 g/cc, or from 0.86 g/cc, or 0.875 g/cc to less than 0.90 g/cc.

In an embodiment, the ethylene/α-olefin copolymer is an ethylene/octene copolymer. A nonlimiting example of a suitable ethylene/octene copolymer is Affinity® EP 8100, having a 190° C. melt index (I2) of 1.0 g/10 min and a density of 0.877 g/cc, available from The Dow Chemical Company.

In an embodiment, the polymeric component is a preblend of the propylene homopolymer and the ethylene/α-olefin copolymer. In other words, the propylene homopolymer and the ethylene/α-olefin copolymer are compounded to form a polymeric composite. The polymeric composite is subsequently blended with the halogen-free flame retardant (and other optional components) to form the present halogen-free composition. In an embodiment, the polymeric component contains from 70 wt %, or 75 wt %, to 85 wt %, or 82 wt %, or 80 wt % of the propylene homopolymer, and from 30 wt %, or 25 wt % to 15 wt %, or 18 wt %, or 20 wt % of an ethylene/octene copolymer. The weight percent is based the total weight of the polymeric component. In a further embodiment, the polymeric component consists of, or consists essentially of, the (i) propylene homopolymer and (ii) the ethylene/α-olefin copolymer in the foregoing weight proportions.

In an embodiment, the polymeric component is an impact-modified polypropylene. An "impact-modified polypropylene" has a continuous phase which is comprised of a propylene polymer, and an elastomeric phase that is dispersed within the continuous phase. The propylene polymer of the continuous phase typically will be a homopolymer propylene polymer or a random or mini-random propylene copolymer, more typically a homopolymer propylene polymer. The propylene polymer may be made using a Ziegler-Natta catalyst, constrained geometry catalyst, metallocene catalyst, or any other suitable catalyst system. When the propylene polymer making up the continuous phase is a homopolymer propylene polymer, the crystallinity of the propylene polymer, as determined by DSC, is preferably at least about 50 percent, more preferably at least about 55 percent, most preferably at least about 62 percent.

The elastomeric phase may be made using a constrained geometry catalyst, Ziegler-Natta catalyst, metallocene catalyst or any other suitable catalyst. Ethylene propylene rubbers are typically made in the second of two reactors coupled in series. Preferred blended elastomers include, but are not limited to, ethylene-octene, ethylene-butylene and ethylene-hexene. Typically, the elastomeric content of the impact propylene copolymer or the blend is from 8 to 40, more typically from 12 to 25 and most typically from 15 to 20 wt % based on the weight of the copolymer or blend.

3. Halogen Free Flame Retardant

The present halogen-free composition includes a halogen-free flame retardant (HFFR). The HFFR is present in an amount from 15 wt %, or 18 wt % to 35 wt %, or 30 wt %, based on the total weight of the halogen-free composition.

The HFFR is selected from ammonium polyphosphate, melamine phosphate, piperazine, and combinations thereof. Nonlimiting examples of suitable HFFR include Budit® 3167 available from Budenheim and/or FR 2100 available from Adeka Palmarole. Budit® 3167 is a proprietary nitrogen/phosphorus based intumescent flame retardant filler and contains 60/20/20 (wt %) ammonium polyphosphate/melamine derivative/dipentaerythritol. FR 2100 is a nitrogen/phosphorus-based intumescent halogen-free flame retardant.

In an embodiment, the HFFR contains a combination of ammonium polyphosphate, melamine phosphate, and piperazine.

In an embodiment, the HFFR contains piperazine.

4. Metal Hydroxide Free

In an embodiment, the present halogen-free composition is free of, or is otherwise void of, a metal hydroxide. The term "metal hydroxide free," (and like terms) as used herein, is the condition that no, or substantially no, metal hydroxide is present or otherwise exists in the present halogen-free composition. A "metal hydroxide," as used herein, is a compound that contains at least one metal-to-hydroxyl bond as shown in structure (I) below.

$$\text{M-OH} \qquad (I)$$

In structure (I), "M" is a metal cation and "OH" is a hydroxyl anion. It is understood that metal valence may dictate additional hydroxyl groups. Nonlimiting examples of metal hydroxide include magnesium hydroxide and aluminum hydroxide. In other words, the present halogen-free composition is free of, or otherwise does not contain, metal hydroxide such as magnesium hydroxide and/or aluminum hydroxide. Applicant discovered that the present halogen-free composition unexpectedly and unpredictably exhibits flame retardance without the need for a metal hydroxide. The omission and/or avoidance of metal hydroxide advantageously contributes to the low density (i.e., less than 1.15 g/cc) of the present halogen-free composition. By avoiding and/or omitting metal hydroxide from the present composition, Applicant discovered a low density composition, that is flame resistant, with excellent flexibility and tensile strength. The present composition also has scrape abrasion resistance suitable to meet the demanding performance requirements for thin and/or ultra-thin, wire insulation applications, particularly for automotive wire and cable applications.

In an embodiment, the present halogen-free composition has a density less than 1.15 g/cc. In a further embodiment, the present halogen-free composition has a density from 0.89 g/cc, or 0.9 g/cc, or 0.91 g/cc, or 0.95 g/cc, or 1.0 g/cc to less than 1.15 g/cc, or less than 1.12 g/cc, or less than 1.10 g/cc. In a further embodiment, the present halogen-free composition exhibits the foregoing density and is free of, or otherwise void of, metal hydroxide.

In an embodiment, the halogen-free composition contains (based on total weight of the halogen-free composition):

50 wt %, or 56 wt % to 70 wt %, or 64 wt %, or 60 wt % of the propylene homopolymer or the mini-random copolymer;

10 wt %, or 14 wt % to 20 wt %, or 18 wt % ethylene/octene copolymer;

15 wt %, or 18 wt %, to 35 wt %, or 30 wt % HFFR;

the composition has a density less than 1.15 g/cc;

the composition is free of metal hydroxide; and the composition has a scrape abrasion resistance of greater than or equal to 350 cycles.

In an embodiment, the present halogen-free composition is free of, or is otherwise void of, styrenic block copolymer. It has been found that styrenic-block copolymer is a poor flame retardant and exhibits smoke when burned.

5. Scrape Abrasion Resistance

The present halogen-free composition exhibits a scrape abrasion resistance greater than or equal to 350 cycles. In an embodiment, the halogen-free composition has a scrape abrasion resistance greater than or equal to 350 cycles, or 400 cycles, or 500 cycles to 1000 cycles, to 900 cycles, or 800 cycles. Scrape abrasion resistance is determined in accordance with ISO 6722.

In an embodiment, the present halogen-free composition exhibits a sandpaper abrasion resistance greater than or equal to 200 millimeters (mm). Sandpaper abrasion resistance is determined in accordance with ISO 6722.

In an embodiment, the present halogen-free composition exhibits a resistance to pinch of over 2 lbs (0.9 kg). Resistance to pinch is determined in accordance with SAE J1678.

In an embodiment, the present halogen-free composition is flame resistant as determined in accordance with SAE J1678.

Applicant discovered a halogen-free composition with a high-load (i.e., greater than or equal to 50 wt % total composition) of propylene homopolymer or mini-random copolymer that is flame retardant and has superior scrape abrasion resistance. The flame retardance of the present composition with greater than 50 wt % propylene homopolymer or mini-random copolymer without the use of halogen flame retardants and/or without the use of metal hydroxide is surprising and unexpected. Applicant's discovery of a low density (less than 1.15 g/cc) composition with a unique combination of high-load propylene homopolymer, halogen-free flame retardance, and superior scrape abrasion resistance is surprising, unexpected and unpredictable.

6. Other Additives

The present halogen-free composition may optionally include other additives. Nonlimiting examples of suitable optional additional additives include stabilizers, antioxidants, UV-absorbers, heat stabilizers, tougheners, impact modifiers, plasticizers, lubricants, emulsifiers, fillers, pigments, optical brighteners, slip agents, and antistatic agents. Nonlimiting examples of suitable fillers include calcium carbonate, silicates, talcum, and carbon black.

The present halogen-free composition may comprise one or more embodiments disclosed herein.

7. Coated Conductor

The present disclosure provides a coated conductor. The coated conductor includes a conductor and a coating on the conductor, the coating formed from the present halogen-free composition described above.

In an embodiment, the coating has a density less than 1.15 g/cc.

In an embodiment, the coating has a scrape abrasion resistance of greater than or equal to 350 cycles.

In an embodiment, the coating has a thickness from 0.1 mm, or 0.2 mm to 2.0 mm, or 1.6 mm.

A "conductor," as used herein, is one or more wire(s) or fiber(s) for conducting heat, light, and/or electricity. The conductor may be a single-wire/fiber or a multi-wire/fiber and may be in strand form or in tubular form. Nonlimiting examples of suitable conductor include metals such as silver, gold, copper, carbon, and aluminum. The conductor may also be optical fiber made from either glass or plastic.

The coated conductor may be flexible, semi-rigid, or rigid. The coating (also referred to as a "jacket" or a "sheath" or "insulation") is on the conductor or on another polymeric layer around the conductor.

The present coated conductor may comprise two or more embodiments disclosed herein.

DEFINITIONS

The terms "comprising", "including", "having" and their derivatives do not exclude the presence of any additional component or procedure. The term, "consisting essentially of" excludes any other component or procedure, except those essential to operability. The term "consisting of" excludes any component or procedure not specifically stated.

"Halogen-free" and like terms mean that the compositions of the invention are without or substantially without halogen content, i.e., contain <2000 mg/kg of halogen as measured by ion chromatography (IC) or similar analytical method. Halogen content of less than this amount is considered inconsequential to the efficacy of the composition as a wire or cable covering.

"Intumescent flame retardant" (and like terms) is a flame retardant that yields a foamed char formed on a surface of a polymeric material during fire exposure.

Test Methods

Crystallinity is measured by differential scanning calorimetry (DSC). In this measurement, a small sample of the propylene polymer is sealed into an aluminum DSC pan. The sample is placed into a DSC cell with a 25 centimeter per minute nitrogen purge and cooled to ° C. A standard thermal history is established for the sample by heating at 10° C. per minute to 225° C. The sample then is re-cooled to about −100° C. and reheated at 10° C. per minute to 225° C. The observed heat of fusion ($\Delta H_{observed}$) for the second scan is recorded. The observed heat of fusion is related to the degree of crystallinity in weight percent based on the weight of the polypropylene sample by the following equation:

$$\text{Crystallinity percent} = (\Delta H_{observed})/(\Delta H_{isotactic\ pp}) \times 100$$

where the heat of fusion for isotactic polypropylene ($\Delta H_{observed}$) is reported in B. Wunderlich, Macromolecular Physics, Volume 3, Crystal Melting, Academic Press, New York, 1960, p 48, as 165 Joules per gram (J/g) of polymer.

Density is measured in accordance with ASTM D 792.

Flame resistance is determined according to SAE J1678.

Test Sample—Prepare a test sample of 600 mm.

Apparatus—A gas burner having a 13 mm inlet, a nominal core of 10 mm, and a length of 100 mm above the primary inlets. The gas burner shall be adjusted to produce a 100 mm gas flame with an inner cone ½ of the height.

Procedure—Suspend the test sample in a draught free chamber and expose the test sample to the tip of the inner cone of the flame. The time of exposure to the test flame shall be 15 seconds. However, the exposure time shall not be longer than the time at which the conductor becomes visible.

Requirement—Any combustion flame of insulating material shall extinguish within 70 seconds and a minimum of 50 mm of insulation at the top of the test sample shall remain unburned.

Flexural modulus is determined in accordance with ASTM D790.

Melt flow rate (MFR) is measured at 230° C. at 2.16 kg in accordance with ASTM D 1238.

Melt index (MI) is determined in accordance with ASTM D 1238, Condition E, 190° C. at 2.16 kg.

Molecular Weight Distribution (MWD) is measured in accordance to ASTM D6474.

Pinch resistance is measured according to SAE J1678.

Test Sample—25 mm of insulation shall be removed from one end of a 900 mm sample of finished cable.

Apparatus—The counter balance is adjusted so that no force is exerted on the sample until a mass is applied to the end of the lever with a mechanical advantage of 10.

Procedure—The sample is placed taut without stretching across a 3 mm diameter steel rod. The sample is subjected to an increasing force applied through the steel anvil by increasing the applied mass at a rate of 2.3 kg per min. At the moment the insulation is pinched through, the test stops. The applied mass is recorded. After each reading, the sample is moved 50 mm and rotated clockwise 90 degrees. Four readings are obtained for each sample. The mean of the four readings determine the pinch resistance of the cable under test.

Scrape abrasion resistance is tested using the scrape tester according to ISO 6722. It is conducted with a needle scratching wire surface under 7N load. The number of cycles that the needle takes to abrade through the insulation is recorded.

Tensile strength at break is measured in accordance with ASTM D638.

Xylene Solubles is measured in accordance to ASTM D5492.

Some embodiments of the present disclosure will now be described in detail in the following Examples.

Examples

1. Component (A) Polymeric Component

The polymeric component is a preblend of (i) propylene homopolymer and (ii) ethylene/octene copolymer available as D117 available from The Dow Chemical Company. The properties of the polymeric component are set forth in Table 1 below.

TABLE 1

| Polymeric component (A) | |
|---|---|
| Polymeric component (A) | properties |
| Propylene homopolymer | *80 wt % |
| Crystallinity 44% (DSC) | |
| Ethylene/octene copolymer | *20 wt % |
| MFR (g/10 min) | 2.1 |
| Melting T (° C.) | 167 |
| Heat of Fusion (J/g) | 92.3 |
| Tensile strength (psi) | 4900 (33.78 MPa) |
| Flexural modulus (psi) | 250,000 (1724 MPa) |

*wt % - based on total weight polymeric component

2. Component (B) HFFR

Halogen-free flame retardants used in the examples are set forth in Table 2 below.

TABLE 2

| HFFR | Available from |
|---|---|
| BAPP (bisphenol A diphenyl phosphate) | Aldrich |
| Budit ® 3167 (Intumescent halogen-free flame retardant system--60/20/20 ammonium polyphosphate/melamine derivative/dipentaerythritol) | Budenheim |
| Silica | Degussa |
| TPP (triphenyl phosphate) | Aldrich |
| $Mg(OH)_2$ | Dead Sea Bromine |

3. Component (C) Additives

The additives used in the examples are set forth in Table 3 below.

TABLE 3

| Additives | |
|---|---|
| Additive | Available from |
| Maleic anhydride modified homopolymer polypropylene (compatibilizer) | Polybond 3200 |
| Pentaerythritol Tetrakis(3-(3,5-di-tert-butyl-4-hydroxyphenyl)propionate) (antioxidant) | Irganox ® 1010 |
| Tris(2,4-di-t-butylphenyl)phosphate (antioxidant) | Irganox ® 168 |

4. Coated Conductor

The polymeric composition (A), HFFR (B) and additive (C) are mixed in a Brabender mixing bowl and are then extruded in a ¾" single-screw Brabender extruder to make coated conductors with 0.2 mm insulation layer. The conductor is 18 AWG/19 strand bare copper.

The scrape abrasion resistance is tested using the scrape tester according to ISO 6722. The scrape abrasion resistance test is conducted with a needle scratching wire surface under 7N load. The number of cycles that the needle takes to abrade through the insulation is recorded.

Resistance to pinch is measured according to SAE J1678. The wire sample is placed across a 3 mm diameter steel rod and is subjected to an increasing force applied with a mass at a rate of 2.3 kg/min. Resistance to pinch of the test sample is the average of 4 values.

Flame resistance is tested following the SAE J1678 procedure. The time to extinguish needs to be less than 70 seconds to pass the SAE J1678 requirement.

Table 4—Coated Conductor properties.

TABLE 4

Coated Conductor Properties (wt %)

|  | Example | CS1 | CS2 | CS3 | CS4 |
|---|---|---|---|---|---|
| Polymeric Component A Inspire ™ D117 | 69 | 69 | 69 | 69 | 54 |
| BAPP |  | 30 | 25 |  |  |
| Budit ® 3167 | 30 |  |  |  |  |
| Silica |  |  | 5 |  |  |
| TPP |  |  |  | 30 |  |
| Mg(OH)$_2$ |  |  |  |  | 40 |
| Polybond 3200 |  |  |  |  | 5 |
| Irganox ®1010 | 0.5 | 0.5 | 0.5 | 0.5 | 0.5 |
| Irganox ® 168 | 0.5 | 0.5 | 0.5 | 0.5 | 0.5 |
| Scrape abrasion resistance (# cycles) | 867 | 382 | 74 | 32 | 722 |
| Pinch resistance (kg) | 2.9 | 3.0 | 2.1 | 1.6 | 3.5 |
| Time to extinguish (seconds) | 1 | 136 | 13 | 146 | 14 |
| Density (g/cc) | 1.06 | — | — | 0.97 | 1.19 |

CS = Comparative Sample
wt % based on the total weight of the insulation layer

Example 1 and comparative samples (CS) CS1 and CS4 pass the ISO 6722 scrape abrasion resistance test of 350 cycles. The other comparative samples do not pass the ISO 6722 scrape abrasion resistance test of 350 cycles.

Example 1, CS2 and CS4 each pass the flame resistance test for SAE J1678. The other comparative samples fail the SAE J1678 flame resistance test.

Only Example 1 passes each test (scrape abrasion, pinch resistance, flame resistance) and has a density less than 1.15 g/cc. We unexpectedly discovered that Example 1, which is void of a metal hydroxide, is halogen-free, low density, flame retardant, and exhibits better scrape abrasion resistance when compared to similar compositions that contain metal hydroxide (i.e., CS4).

What is claimed is:

1. A halogen-free composition comprising:
A. a polymeric component comprising
   (i) a propylene homopolymer or a mini-random copolymer with greater than 40% crystallinity;
   (ii) an ethylene/octene copolymer;
B. a halogen-free flame retardant;
the composition comprising
from 50 wt % to 70 wt % of the propylene homopolymer;
from 10 wt % to 20 wt % ethylene/octene copolymer; and
from 15 wt % to 35 wt % halogen-free flame retardant,
the composition having a density less than 1.15 g/cc; and
a scrape abrasion resistance of greater than or equal to 350 cycles as measured in accordance with ISO 6722.

2. The composition of claim 1 wherein the propylene homopolymer or mini-random copolymer has a crystallinity greater than or equal to 55% to 75%.

3. The composition of claim 1 wherein the polymeric component comprises
(i) from 70 wt % to 90 wt % of the propylene homopolymer; and
(ii) from 30 wt % to 15 wt % of the ethylene/octene copolymer.

4. The composition of claim 1 wherein the halogen-free flame retardant is selected from the group consisting of ammonium polyphosphate, melamine phosphate, piperazine, and combinations thereof.

5. A halogen-free composition comprising:
A. from 70 wt % to 85 wt % of a polymeric component comprising
   (i) a propylene homopolymer or a mini-random copolymer with greater than 40% crystallinity;
   (ii) an ethylene/α-olefin copolymer;
B. from 30 wt % to 15 wt % a halogen-free flame retardant;
the composition having a density less than 1.15 g/cc; and
a scrape abrasion resistance of greater than or equal to 350 cycles as measured in accordance with ISO 6722, wherein the composition is free of a metal hydroxide.

6. A halogen-free composition comprising:
A. from 70 wt % to 85 wt % of a polymeric component comprising
   (i) a propylene homopolymer or a mini-random copolymer with greater than 40% crystallinity;
   (ii) an ethylene/α-olefin copolymer;
B. from 30 wt % to 15 wt % a halogen-free flame retardant;
the composition having a density less than 1.15 g/cc; and
a scrape abrasion resistance of greater than or equal to 350 cycles as measured in accordance with ISO 6722, wherein the composition has a sandpaper abrasion resistance greater than or equal to 200 mm.

7. A coated conductor comprising:
a conductor;
a coating on the conductor, the coating formed from the composition of claim 1.

8. The coated conductor of claim 7 wherein the coating has a thickness from 0.1 mm to 2.0 mm.

9. The composition of claim 1 wherein the composition has a time to extinguish of less than 70 seconds as measured in accordance with SAE 11678.

10. The composition of claim 5 wherein the propylene homopolymer or mini-random copolymer has a crystallinity greater than or equal to 55% to 75%.

11. The composition of claim 5 wherein the polymeric component comprises
(i) from 70 wt % to 90 wt % of the propylene homopolymer; and
(ii) from 30 wt % to 15 wt % of the ethylene/α-olefin copolymer.

12. The composition of claim 5 wherein the halogen-free flame retardant is selected from the group consisting of ammonium polyphosphate, melamine phosphate, piperazine, and combinations thereof.

13. The composition of claim 5 wherein the composition has a time to extinguish of less than 70 seconds as measured in accordance with SAE J1678.

14. A coated conductor comprising:
a conductor;
a coating on the conductor, the coating formed from the composition of claim 5.

15. The composition of claim 6 wherein the propylene homopolymer or mini-random copolymer has a crystallinity greater than or equal to 55% to 75%.

16. The composition of claim 6 wherein the polymeric component comprises
(i) from 70 wt % to 90 wt % of the propylene homopolymer; and
(ii) from 30 wt % to 15 wt % of the ethylene/α-olefin copolymer.

17. The composition of claim 6 wherein the halogen-free flame retardant is selected from the group consisting of ammonium polyphosphate, melamine phosphate, piperazine, and combinations thereof.

18. The composition of claim 6 wherein the composition has a time to extinguish of less than 70 seconds as measured in accordance with SAE J1678.

19. A coated conductor comprising:
   a conductor;
   a coating on the conductor, the coating formed from the composition of claim 6.

* * * * *